United States Patent
Harda et al.

(10) Patent No.: US 9,604,594 B2
(45) Date of Patent: Mar. 28, 2017

(54) METHOD FOR OPERATION OF A SAFETY ARRANGEMENT IN A VEHICLE

(71) Applicant: VOLVO CAR CORPORATION, Gothenburg (SE)

(72) Inventors: Peter Harda, Torslanda (SE); Anders Axelson, II, Torslanda (SE); Stefan Berge, Vastra Frolunda (SE); Par Nilsson, Molndal (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/925,326

(22) Filed: Oct. 28, 2015

(65) Prior Publication Data
US 2016/0129879 A1 May 12, 2016

(30) Foreign Application Priority Data
Nov. 6, 2014 (EP) .................... 14192041

(51) Int. Cl.
*B60N 2/427* (2006.01)
*B60N 2/42* (2006.01)
(Continued)

(52) U.S. Cl.
CPC .......... *B60R 22/46* (2013.01); *B60N 2/42727* (2013.01); *B60N 2/42745* (2013.01);
(Continued)

(58) Field of Classification Search
CPC B60N 2/42727; B60N 2/42745; B60R 21/01; B60R 22/46
(Continued)

(56) References Cited

U.S. PATENT DOCUMENTS 4,040,660 A * 8/1977 Barecki .................... B60N 2/23
297/216.13
5,746,467 A * 5/1998 Jesadanont .......... B60N 2/4221
297/216.13 X
(Continued)

FOREIGN PATENT DOCUMENTS

DE   102010031257 A1   1/2012
EP       1454806 A2    9/2004
EP       2307234 B1    1/2012

OTHER PUBLICATIONS

Extended European Search Report Dated Feb. 24, 2015, Application No. 14192041.3-1503, Applicant Volvo Car Corporation, 5 Pages.

*Primary Examiner* — Rodney B White
(74) *Attorney, Agent, or Firm* — Brooks Kushman P.C.

(57) ABSTRACT

A method is provided for operation of a safety arrangement in a vehicle. The safety arrangement comprises a seat belt, a seat belt retractor and at least one seat position adjustment arrangement for position adjustment of a seat of the vehicle and/or a portion of the seat. The method comprises a refraction of the seat belt by means of the seat belt retractor with a retraction force, and a pre-crash displacement of the seat and/or the portion of the seat resulting in a displacement force acting on the seat belt. The method further comprises adapting the pre-crash displacement and the refraction of the seat belt to each other by ascertaining that a combined seat belt force comprising the refraction force and the displacement force does not exceed a selectable level. The disclosure further relates to a safety arrangement for a vehicle and a vehicle comprising such a safety arrangement.

20 Claims, 5 Drawing Sheets

(51) Int. Cl.
  *B60R 21/013* (2006.01)
  *B60R 21/0134* (2006.01)
  *B60R 22/46* (2006.01)
  *B60R 21/01* (2006.01)

(52) U.S. Cl.
  CPC ...... B60R 21/01 (2013.01); *B60R 2022/4685* (2013.01); *B60R 2300/301* (2013.01)

(58) Field of Classification Search
  USPC .............. 297/216.1, 216.13–216.2, 474–480
  See application file for complete search history.

(56) References Cited

U.S. PATENT DOCUMENTS

| | | | | |
|---|---|---|---|---|
| 6,076,887 A * | 6/2000 | Andersson | ........... | B60N 2/4235 297/216.1 |
| 6,109,692 A * | 8/2000 | Håland | ................ | B60N 2/4228 297/216.13 |
| 6,829,952 B2 * | 12/2004 | Stanley | ................... | G01L 5/103 73/862.391 |
| 7,195,092 B2 * | 3/2007 | Wu | .................... | B60N 2/42745 297/216.1 X |
| 8,302,995 B2 * | 11/2012 | Xu | ..................... | B60R 21/0136 297/479 X |
| 2001/0038233 A1 * | 11/2001 | Eklind | ................. | B60N 2/4221 297/216.13 |
| 2004/0070240 A1 * | 4/2004 | Håland | ................ | B60N 2/4885 297/216.13 X |
| 2005/0146174 A1 * | 7/2005 | Maddelein | .............. | B60N 2/02 297/216.1 |
| 2007/0114768 A1 | 5/2007 | Lennir | | |
| 2007/0290535 A1 * | 12/2007 | Meredith | ........... | B60N 2/42736 297/480 X |
| 2008/0203785 A1 * | 8/2008 | Patwardhan | ......... | B60N 2/4885 297/216.13 |
| 2008/0203786 A1 * | 8/2008 | Niitsuma | ................. | B60N 2/22 297/216.13 |
| 2008/0211275 A1 * | 9/2008 | Lamparter | ............. | B60N 2/686 297/216.13 |
| 2011/0140504 A1 * | 6/2011 | Bolton | .................... | B60R 22/02 297/477 |
| 2011/0227378 A1 * | 9/2011 | Swierczewski | .......... | B60N 2/06 297/216.1 X |
| 2013/0015686 A1 * | 1/2013 | Islam | .................... | B64D 11/06 297/216.13 X |
| 2013/0049416 A1 * | 2/2013 | Funke | .................... | B64D 11/06 297/216.13 |
| 2013/0307301 A1 * | 11/2013 | Munemura | .......... | B60N 2/4228 297/216.13 |
| 2016/0082922 A1 * | 3/2016 | Yoon | ....................... | B60R 22/46 297/478 X |

* cited by examiner

METHOD FOR OPERATION OF A SAFETY ARRANGEMENT IN A VEHICLE

CROSS-REFERENCE TO RELATED APPLICATIONS

This application claims foreign priority benefits under 35 U.S.C. §119(a)-(d) to European patent application number EP 14192041.3, filed Nov. 6, 2014, which is incorporated by reference in its entirety.

TECHNICAL FIELD

The present disclosure relates to a method for operation of a safety arrangement in a vehicle. The disclosure further relates to a safety arrangement of a vehicle and a vehicle comprising such a safety arrangement.

BACKGROUND

A modern vehicle, such as a car, is provided with safety arrangements in order to prevent or avoid It is well-known to use a safety arrangement comprising a seat belt for restraining the movement of the seat occupant in case of a sudden change of speed of the vehicle. Yet, a modern seat belt permits the seat occupant to move during normal driving conditions or when the vehicle stands still by adjusting the used length of the seat belt according to the movements of the seat occupant, e.g., when the seat occupant leans forwards.

It is known to use a retractor to suddenly and forcefully retract the seat belt in case of a collision or imminent collision being detected, since it is beneficial for the seat occupant to be located close to a seat back and a headrest in such a situation. The sudden and forceful retraction of the seat belt may be uncomfortable for the seat occupant, and may even cause a minor injury to the seat occupant. However, the advantages of being seated close to the seat back and headrest in case of a collision outweigh any discomfort or minor injury.

It is also known to reposition a seat or a portion of the seat, e.g., the seat back, in order to bring the seat occupant into a more favorable position in case of a collision or imminent collision being detected. Purely as an example, if the seat back is inclined backwards, it may be beneficial to move it to a more upright position, e.g., in case of a rear-end collision.

Document EP 1 454 806 A2 discloses a device, which regulates or controls an occupant restraint system of a motor vehicle in dependence on a pulling force acting on a seat belt. The force is measured between a subassembly anchored to the vehicle structure and another subassembly that is movable away from the first subassembly. Force measurement signals are evaluated by an evaluating device for the setting of at least one restraint function of a vehicle occupant restraint system during normal driving conditions, during a pre-crash condition or during a crash, in a computer-assisted manner.

Document EP 1 454 806 A2 describes the above-described use of a refractor to suddenly and forcefully retract the seat belt in case of a collision or imminent collision being detected as well as to reposition a seat or a portion of the seat in order to bring the seat occupant in a favorable position. However, if performing both the retraction and the repositioning at the same times, as is described in document EP 1 454 806 A2, there is a risk that a seat occupant may be exposed to such a high seat belt force, that it may cause discomfort to the seat occupant or even an injury, e.g., breaking a collar bone or a rib.

SUMMARY

An object of the present disclosure is to overcome or ameliorate at least one of the disadvantages of the prior art, or to provide a useful alternative.

It is desirable to provide a method for operation of a safety arrangement in a vehicle not causing unnecessary discomfort, or even injury, to a seat occupant using the seat belt.

Thus, in a first aspect of the present disclosure there is provided a method for operation of a safety arrangement in a vehicle. The safety arrangement comprises a seat belt, a seat belt retractor and at least one seat position adjustment arrangement for position adjustment of a seat of the vehicle and/or a portion of the seat. The operation of the safety arrangement comprises a retraction of the seat belt by means of the seat belt retractor with a retraction force, and a pre-crash displacement of the seat and/or the portion of the seat resulting in a displacement force acting on the seat belt. The method comprises adapting the pre-crash displacement and the retraction of the seat belt to each other by ascertaining that a combined seat belt force comprising the retraction force and the displacement force does not exceed a selectable level.

By ascertaining that the combined seat belt force comprising the retraction force and the displacement force does not exceed the selectable level, it is avoided, or at least is a risk reduced, to cause unnecessary discomfort, or even injury, to a seat occupant using the seat belt.

The adapting of the pre-crash displacement and the retraction of the seat belt to each other comprises selecting during which time periods the pre-crash displacement and the retraction, respectively, are performed and/or which force levels are utilized for the pre-crash displacement and the retraction, respectively, and how they are related to each other.

The vehicle may be a car, a bus, a lorry or a truck. The seat may be a seat for the driver or for a passenger of the vehicle.

The retraction and the pre-crash displacement may be triggered by a system of the vehicle detecting a collision and/or a risk situation being detected, i.e., a situation of danger or potential danger. The risk situation may be that a collision is imminent or that a driver of the vehicle has lost control of the vehicle. A collision may be predicted to affect a seat occupant, i.e., a user of the seat at a certain point in time, and the retraction and the pre-crash displacement are preferably activated before that point in time in order to displace the seat occupant to a more favorable position, i.e., a position less prone to cause injury and/or discomfort.

The retraction force is applied by the seat belt retractor and is used to pull the seat belt back, i.e., retract the seat belt. It may be desirable to move the seat occupant back to a more favorable position against the backrest, in case the seat occupant e.g., is leaning forwards.

The retraction force should be differentiated from a pre-tension force used to keep the seat belt tensioned, when the seat occupant moves in the seat during normal driving conditions. The refraction force used is normally a number of times higher than the pre-tension force, e.g., at least twice, at least three times, at least five times, at least ten times or at least twenty times higher than the pre-tension force.

The seat position adjustment arrangement may be adapted for position adjustment of a seat of the vehicle in relation to a body of the vehicle. As an alternative, or as a complement, the seat position adjustment arrangement may be adapted for position adjustment of a portion of the seat, e.g., a seat back, in relation to the rest of the seat, e.g., in order to displace the seat back to the more favorable upright position in case of a collision. One or more seat position adjustment arrangements may be used for the seat, e.g., adapted to adjust different portions of the seat or the whole seat in relation to the body of the vehicle. If two or more seat position adjustment arrangements are utilized, they may be active in parallel or consecutively. The displacement force then comprises the combined force of the two or more seat position adjustment arrangements. The repositioning movements of the two or more seat position adjustment arrangements may at least partly overlap time wise, or they may be performed consecutively. Purely as an example, if there is both a seat position adjustment arrangement adapted to displace the seat in relation to the body of the vehicle and a seat back inclination adjustment arrangement adapted to displace the seat back in relation to the rest of the seat, they may be configured such that first the whole seat is displaced and then the seat back is adjusted.

When moving the seat or portion thereof with the seat occupant present in the seat, the displacement may push the seat occupant towards the seat belt. Thereby a force caused by the seat position adjustment arrangement, herein denoted a displacement force, adds to the retraction force resulting in a combined seat belt force. The retraction force and the displacement force may act on the seat occupant in different directions. Purely as an example, the retraction force may pull a seat occupant backwards in the vehicle by means of the tightening the seat belt, while the displacement force may push the seat occupant forwards in the vehicle, e.g., by raising the seat back.

A too high combined seat belt force may cause discomfort to the seat occupant or even injury, e.g., breaking a collar bone or a rib. It is therefore desirable to keep the combined seat belt force below the selectable level. The level of the combined seat belt force may be selected in order to avoid discomfort and/or injury.

The level of the combined seat belt force may be selected based on vehicle occupant data. The vehicle occupant data may comprise personal data about the seat occupant, such as sex, length, weight, and/or perceived data, such as an individual comfort level or expected non-injury level.

The adapting of the pre-crash displacement and the retraction of the seat belt to each other by ascertaining that a combined seat belt force comprising the retraction force and the displacement force does not exceed a selectable level may be achieved in various ways or combination of ways, whereof some ways are described in more detail below.

The adapting may comprise stopping or slowing down the pre-crash displacement of the seat if determining that the combined seat belt force is about to reach the selectable level. This may result in that the available time will not be sufficient for the seat and/or the portion thereof to reach a position being the most favorable position for the seat occupant. However, the reached position will at least be more favorable than the position before the displacement.

The adapting may comprise releasing the seat belt during the pre-crash displacement, such that the releasing at least partly corresponds to a tightening of the seat belt caused by the pre-crash displacement of the seat.

As mentioned above, the retraction force and the displacement force may act on the seat occupant in different directions. Purely as an example, the retraction force may pull a seat occupant backwards in the vehicle, while the displacement force may push the seat occupant forwards in the vehicle, e.g., by raising the seat back. In that case, the seat belt may, at least during a portion of the pre-crash displacement, be released instead of being retracted, such that the combined seat belt force is maintained below the selectable level.

The adapting may comprise first starting the pre-crash displacement, and at a later point of time performing the retraction of the seat belt, preferably performing the retraction simultaneously with a part of the pre-crash displacement. However, the refraction is desirably started early enough to be at least substantially ready at the point in time when the collision is predicted to affect the seat occupant.

The pre-crash displacement may comprise displacing the seat in relation to the body of the vehicle and/or displacing the seat back in relation to a seat squab. The seat may be translationally displaced in relation to a body of the vehicle, e.g., by displacing the seat along rails provided in a floor of the vehicle. The seat back may be inclined or raised in relation to the squab. The squab itself may inclined more or less in relation to the floor of the vehicle, e.g., in order to compensate for adjustments performed by the seat occupant which are not optimal from a safety point of view.

The combined seat belt force may be monitored by determining if the seat belt is actually being retracted, when the seat belt retractor is activated. This may be performed by monitoring pulled out length of the seat belt and/or determining a speed of a motor of the seat belt refractor. If the retraction movement stops, the retraction force may e.g., be at such a high level, that the motor cannot retract the seat belt any more. As the maximum retraction force of the motor may be chosen to reflect the maximum tolerable force for the occupant, this would be an indication that further displacement of the seat could desirably be compensated by releasing a corresponding length of seat belt.

The method may optionally further comprise determining if a seat occupant is present in a seat, to which the seat belt is associated, the seat belt only being refracted, if it is determined that a seat occupant is present in the seat.

The method may optionally further comprise determining if a seat occupant is present in a seat to which the seat belt is associated, the seat or the portion thereof only being displaced in a pre-crash displacement, if it is determined that a seat occupant is present in the seat.

If there is no seat occupant present in the seat, there is no use to retract the seat belt or displace the seat or the portion thereof. Sometimes, a bag or similar can be put in a seat and attached by applying the seat belt through e.g., a handle of the bag. Thereby, it can be avoided that the bag is thrown around in the vehicle in case of a sudden speed change of the vehicle. It may in such a case be favorable to anyway retract the seat belt, although the seat is occupied by an object, and not a person. The term seat occupant as used herein is thus not restricted to human beings, but may also include other objects or animals occupying the seat.

The method may further optionally comprise determining if the seat belt is buckled up. If the seat belt is not buckled up, there is no point in retracting the seat belt with the above-mentioned retraction force in case of a collision.

According to a standard configuration of the seat belt, there is a first belt portion running across the torso of the seat occupant and a second belt portion running over the hip of the seat occupant. If the seat occupant leans forwards, it is primarily the length of the first belt portion, which is increased. The above-mentioned retraction force is therefore preferably applied to the first belt portion.

In a second aspect of the present disclosure, there is provided a safety arrangement for a vehicle, which vehicle comprises a seat. The safety arrangement comprises:

a seat belt, a seat belt retractor adapted for retraction of the seat belt with a retraction force, at least one seat position adjustment arrangement adapted for a pre-crash displacement of the seat and/or a portion of the seat, the pre-crash displacement resulting in a displacement force acting on the seat belt, a first sensor for determining a combined seat belt force acting on the seat belt, the combined seat belt force comprising the retraction force and the displacement force, and a processor, which is adapted for adapting the pre-crash displacement and the retraction of the seat belt to each other by ascertaining that the combined seat belt force does not exceed a selectable level.

It may be advantageous that the safety arrangement comprises a reversible restraint system, e.g., the retractor and/or the seat position adjustment arrangement being electrically and/or or mechanically operated. The reversibility is in particular advantageous, if the restraint system would be activated in case of a risk situation, such as an imminent collision, since in that case the restraint system may be easily reset if it was activated unnecessarily, e.g., the collision was actually avoided or was less severe than anticipated. Thereby, the threshold for activating the restraint system may be lowered, since there is only a little effort, and/or cost, involved to reset it. The restraint system may thus be activated already when a risk for a collision is detected. If instead using an irreversible restraint system, such as a system initiated by pyrotechnical means, the vehicle would need to go to e.g., a garage or a workshop to replace the pyrotechnical means, thus resulting in cost and effort.

The least one seat position adjustment arrangement may be adapted for displacing the seat in relation to the body of the vehicle and/or displacing the seat back in relation to a seat squab. The seat may be translationally displaced in relation to a body of the vehicle, e.g., by displacing the seat along rails provided in a floor of the vehicle. The seat back may be inclined or raised in relation to the squab. The squab itself may be inclined in a higher or a lower degree in relation to the floor of the vehicle, e.g., in order to compensate for adjustments performed by the seat occupant which are not optimal from a safety point of view.

The first sensor may comprise or be constituted by a sensor for determining pulled out length of the seat belt, i.e., a seat belt extension sensor.

The first sensor may comprise or be constituted by a sensor for determining speed of the motor of the seat belt retractor. If the retraction movement stops, the retraction force may e.g., be at such a high level, that the motor cannot retract the seat belt any more.

The safety arrangement may further comprise a second sensor for determining a position of a seat, to which the seat belt is associated, or for determining a position of a portion of the seat, e.g., a seat back. The second sensor may coincide with the first sensor. The position of the seat may be determined by means of a sensor in the seat or a sensor sensing a setting of the seat position adjustment arrangement.

The seat back inclination may be measured by means of a sensor in the seat back or a sensor sensing a setting of the seat back inclination adjustment arrangement. As an alternative or a complement, the degree of inclination of the seat back may be determined by determining the current length of pulled out seat belt. In that case, the sensor for determining a position of a seat back may be the above-mentioned seat belt extension sensor, which directly or indirectly measures a parameter corresponding to the current length of the seat belt being pulled out. The sensor may e.g., directly measure the current length. Alternatively, the sensor may measure the rotation of a retractor spool being used for storing the seat belt. It may e.g., measure the angular position of the retractor spool. Such sensors are known to the skilled person from e.g., the document US 2007/0114768 A1. As an alternative or a complement, the current length of pulled out seat belt may be determined by determining the shape of the seat occupant and/or the position of the seat occupant in relation to the seat, e.g., by means of a camera system or an IR camera system, and thereby indirectly determine the current length of pulled out seat belt. It is also possible to use a camera system to directly detect where the seat belt is located and hence determine its pulled out length. For commonly used seat belt arrangements, the more the seat back is inclined backwards, the shorter length of seat belt is utilized.

The safety arrangement may further comprise a system for detecting a collision or an imminent collision involving the vehicle. The system may comprise a remote sensor system, e.g., a camera system, an IR camera system, a radar, a lidar, an ultrasonic sensor system, an accelerometer and/or a vehicle dynamics sensor, such as a steering wheel angle sensor. As an alternative, or in addition, the system may comprise a contact sensor system, e.g., a piezoelectric sensor. The retractor and/or seat position adjustment arrangement may be triggered directly by the remote sensor system detecting an imminent collision, and/or the triggering may be based on the actual contact between an object and the vehicle, i.e., an actual collision. The collision detection system is preferably connected to the processor. One or more sensors may be used by the collision detection system. They may be located at various positions in the vehicle depending on type of sensor, both on the outside of the vehicle and within the vehicle, e.g., at a front of the vehicle or at a rear end of the vehicle.

The safety arrangement may further comprise a seat belt usage sensor. The seat belt sensor usage sensor is used to see if the seat belt is buckled up.

The safety arrangement may form a part of a larger system of the vehicle, such as an anti-collision system. The safety arrangement may be associated with a driver-assist system, such that the safety arrangement may be activated, if it is detected that the driver has lost control of the vehicle, which is an example of a risk situation, since losing control of the vehicle may lead to a collision.

In a third aspect of the present disclosure there is a vehicle comprising a safety arrangement as described herein. The vehicle may be a car, bus, lorry or truck.

BRIEF DESCRIPTION OF THE DRAWINGS

Non-limiting embodiments according to the present disclosure will hereinafter be further explained with reference to the appended drawings, wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by non-limiting embodiments. It should however be realized that the embodiments are included in order to explain principles of the disclosure and not to limit the scope of the disclosure, defined by the appended claims. Furthermore, details from two or more of the embodiments may be combined with each other.

Figure 1:
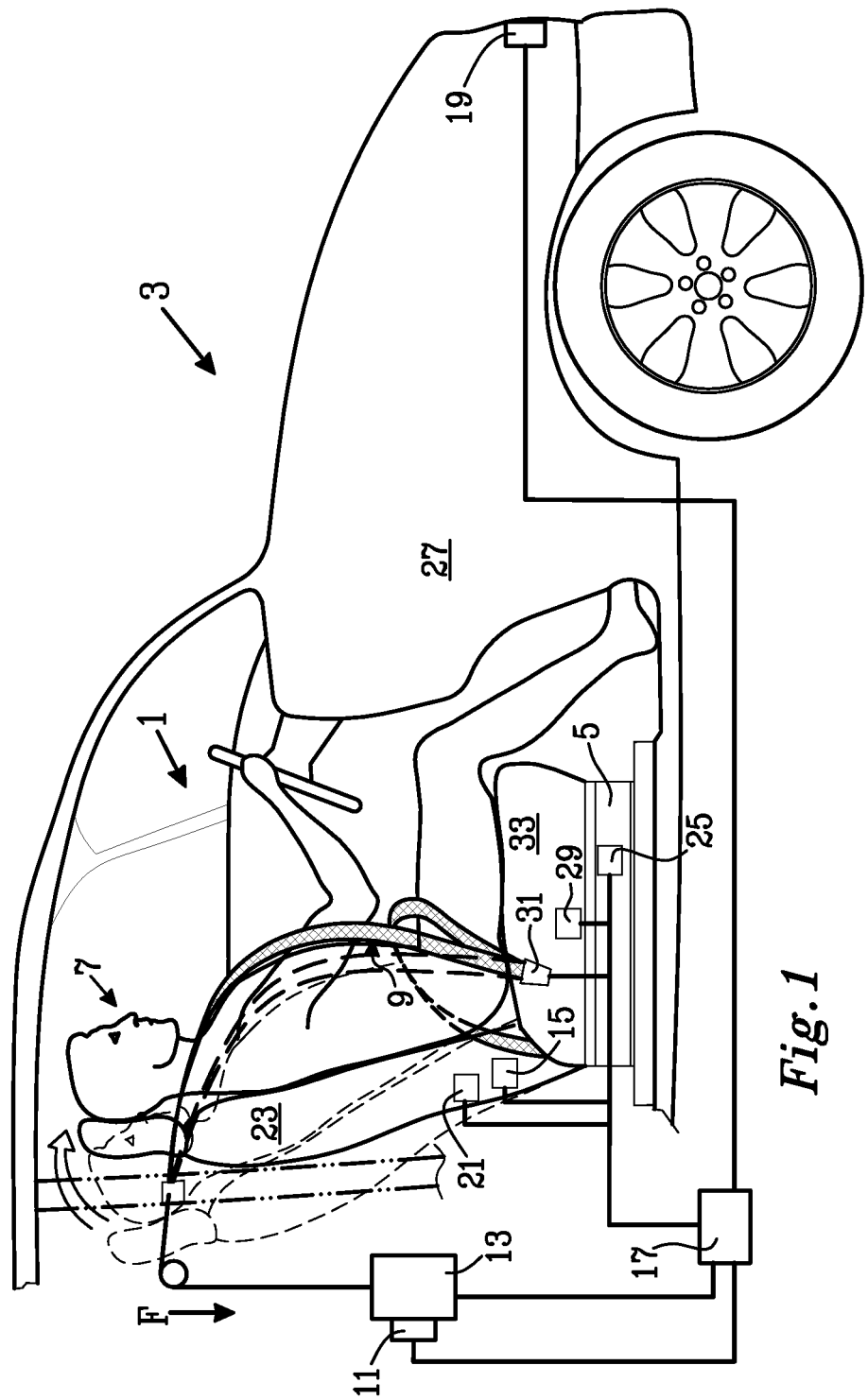
FIG. 1 illustrates a vehicle with a safety arrangement according to the disclosure.

FIG. 1 schematically illustrates a safety arrangement 1 of a vehicle 3. The vehicle 3 comprises a seat 5, in which a seat occupant 7 is seated. The seat occupant 7 has buckled up a seat belt 9, being a part of the safety arrangement 1. The safety arrangement 1 further comprises a first sensor 11 for determining a combined seat belt force acting on the seat belt 9, a seat belt retractor 13 for retracting the seat belt 9, at least one seat position adjustment arrangement 15, 29 and a processor 17. The seat belt retractor 13 and the at least one seat position adjustment arrangement 15, 29 are examples of restraint system utilized to mitigate the consequences for the seat occupant 7 of a collision involving the vehicle 3.

As an option, illustrated in FIG. 1, the safety arrangement 1 may comprise a system 19 for detecting a collision or a risk situation, such as an imminent collision, involving the vehicle 3, below denoted a collision detection system. As another option, also illustrated in FIG. 1, the safety arrangement 1 may comprise a second sensor for determining a position of a portion of the seat 5, e.g., a sensor 21 for determining a position of a seat back 23 and/or a sensor 25 for determining a position of the seat 5 in relation to a vehicle body 27. The vehicle 5 may comprise a seat back inclination adjustment arrangement 15 and/or an arrangement 29 for positioning the seat 5 in relation to the vehicle body 27. The second sensor 21 may be located in the seat 5 or may be a sensor sensing a setting of its adjustment arrangement 9. The second sensor 25 may be located in the seat back 23 or may be a sensor sensing a setting of the seat back inclination adjustment arrangement 15. The safety arrangement 1 may also comprise a seat belt usage sensor 31, which is used to detect if the seat belt 9 is buckled up.

The collision detection system 19 may comprise a remote sensor system, e.g., a camera system, an IR camera system, a radar, a lidar, an ultrasonic sensor system, an accelerometer and/or a vehicle dynamics sensor, such as a steering wheel angle sensor. As an alternative, or in addition, the collision detection system 19 may comprise a contact sensor system, e.g., a piezoelectric sensor. The retractor 13 and/or the seat position adjustment arrangement, here the seat back inclination adjustment arrangement 15 and/or the arrangement 29 for positioning the seat 5 in relation to the vehicle body 27, may be triggered directly by the remote sensor system detecting an imminent collision, and/or the triggering may be based on the actual contact between an object and the vehicle 3, e.g., a bumper, i.e., an actual collision. The collision detection system 19 is connected to the processor 17. One or more sensors may be used by the collision detection system 19. They may be located at various positions in the vehicle 3 depending on type of sensor, both on the outside of the vehicle 3 and within the vehicle 3, e.g., at a front of the vehicle 3, as is illustrated, or at a rear end of the vehicle 3.

The retractor 13 is adapted to retract the seat belt 9 by applying a retraction force, in case of a collision and/or a risk situation, such as an imminent collision, being detected by the collision detection system 19. Thereby the seat occupant 7 may be moved towards the seat back 23, if e.g., the seat occupant leans forward.

The seat 5 comprises the seat back 23 and a squab 33. The seat back inclination adjustment arrangement 15 is adapted to displace the seat back 23 to a favorable position in relation to the squab 33. It may happen that the seat occupant 7 puts the seat back 23 in a backwards inclined position, indicated by dashed lines in FIG. 1. In case of collision, in particular a rear-end collision, it is more favorable that the seat back 23 assumes a more upright position, indicated by continuous lines in FIG. 1. The seat back inclination adjustment arrangement 15 is arranged to displace the seat back 23 to the more upright position. The displacement of the seat back 23 to the more upright position will push the seat occupant 7 towards the seat belt 9. Thereby a force caused by the seat back inclination adjustment 15, herein denoted a displacement force, adds to the retraction force to a combined seat belt force.

The seat back inclination may be measured by means of the sensor 21 in the seat back 23 or a sensor sensing a setting of the seat back inclination adjustment arrangement 15. As an alternative or a complement, the degree of inclination of the seat back 23 may be determined by determining the current length of pulled out seat belt 9. In that case the second sensor 21, i.e., the sensor for determining a position of a seat back 23, may be a seat belt extension sensor, which directly or indirectly measures a parameter corresponding to the current length of the seat belt being pulled out. The sensor 21 may e.g., directly measure the current length. Alternatively, the second sensor 21 may measure the rotation of a retractor spool being used for storing the seat belt. It may e.g., measure the angular position of the retractor spool. Such sensors are known to the skilled person from e.g., the document US 2007/0114768 A1. As an alternative or a complement, the current length of pulled out seat belt 9 may be determined by determining the shape of the seat occupant and/or the position of the seat occupant 7 in relation to the seat 5, e.g., by means of a camera system or an IR camera system, and thereby indirectly determine the current length of pulled out seat belt 9. It is also possible to use a camera system to directly detect where the seat belt 9 is located and hence determine its pulled out length. For commonly used seat belt arrangements like the one illustrated in FIG. 1, the more the seat back 23 is inclined backwards, the shorter length of seat belt 9 is utilized. The second sensor 21 may coincide with the first sensor 11. Hence, although the second sensor 21 is illustrated as located in or at the seat back 23, it may also be located elsewhere in the vehicle 3.

The correctness of the prediction of a collision, e.g., as detected by the collision detection system 19, increases in general the closer to a time $t_0$, when the collision is predicted to affect the seat occupant, the prediction is made. Hence, a late activation of a restraint system reduces the risk of activating it incorrectly. If waiting until the time $t_0$ is reached, i.e., until the collision is actually affecting the user of the seat belt, the correctness would be close to 100% or substantially 100%. On the other hand, it takes some time to operate a component of a restraint system. Purely as an example, the time period utilized to retract a seat belt, denoted by $\Delta_1$ in FIG. 2, may be between 0.1 s and 0.5 s or between 0.2 s and 0.4 s. Purely as another example, the time period utilized to perform a pre-crash displacement of the seat or a portion thereof, denoted by $\Delta_2$ in FIG. 2, may be between 0.5 s and 3 s, or between 0.7 s and 1.5 s, or between 0.8 and 1.2 s, with s denoting seconds. Thus, if activating the restraint system too late, it will not be ready at the time $t_0$, when the collision is predicted to affect the seat occupant.

Figure 2:
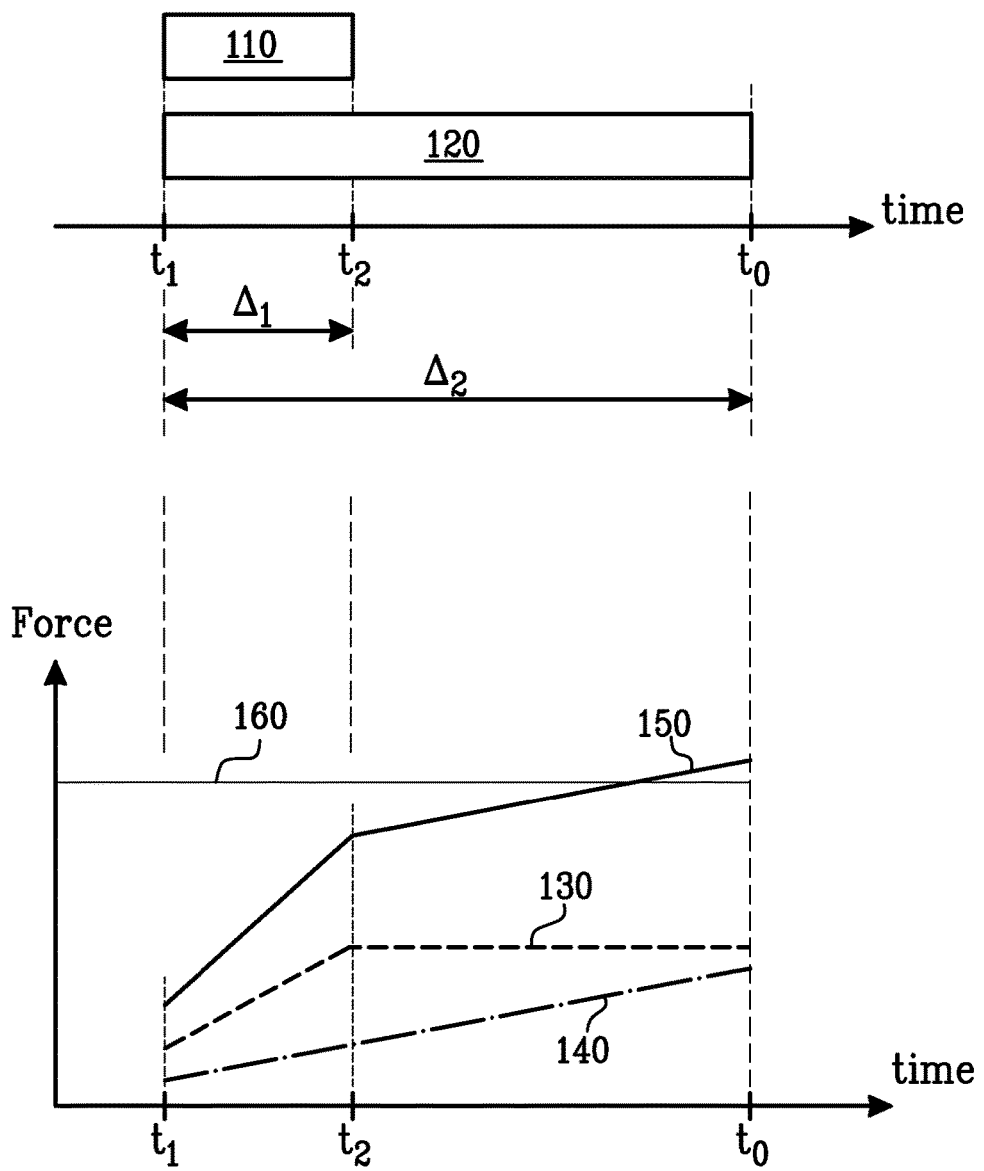
FIG. 2 illustrates a method according to prior art for operation of a safety arrangement in a vehicle.

FIG. 2 schematically illustrates a time line for a method according to prior art for operation of a safety arrangement according to prior art.

It is known from prior art, e.g., document EP 1 454 806 A2, to perform retraction 110 of the seat belt with a retraction force 130 by means of a seat belt retractor. It is also known from prior art, e.g., document EP 1 454 806 A2, to perform a pre-crash displacement 120 of a seat and/or portion of the seat. The collision is predicted to affect the seat occupant 7 at the time $t_0$. In the prior art method, both the retraction 110 and the pre-crash displacement 120 starts at a point of time $t_1$, which may be the point in time when the collision or an imminent collision is detected or a point in time between the detection and the time $t_0$. Typically the time period $\Delta_1$ utilized to pull in the seat belt, i.e., retracting it, is less than the time period $\Delta_2$ utilized to perform the pre-crash displacement 120, as illustrated in FIG. 2. The time period $\Delta_1$ utilized to retract the seat belt ends at a time $t_2$.

When performing the seat belt retraction 110, the seat belt force is increased since the seat belt is tightened by being retracted, see the lower half of FIG. 2 with a dashed line schematically indicating the refraction force 130. After the excessive length of seat belt has been refracted, i.e., after the time $t_2$, the retraction force 130 is in this example at a substantially constant level, e.g., given by the maximum capacity of the motor refracting the seat belt.

When performing the pre-crash displacement 120, the seat belt force is increased since the seat belt is tightened due to the displacement of the seat and/or the portion thereof, see the lower half of FIG. 2 with a point-dashed line 140 indicating the seat belt force resulting from the pre-crash displacement 120, in this example illustrated as a continuously increasing function.

A solid line 150 in the lower half of FIG. 2 indicates a combination of the two forces 130, 140. As may be seen the combined force 150 exceeds a selectable level 160, e.g., corresponding to a discomfort level or injury level of the seat occupant. In this example, the combined force 150 crosses the selectable level 160, at a point in time being between $t_2$ and $t_0$.

According to the method as described herein, the pre-crash displacement 120 and the refraction 110 of the seat belt are adapted to each other, by ascertaining that the combined seat belt 150 force comprising the retraction force 130 and the displacement force 140 does not exceed the selectable level 160. This adapting may be achieved in various ways or combination of ways, whereof some ways are schematically described below in conjunction with FIGS. 3-5.

Figure 3:
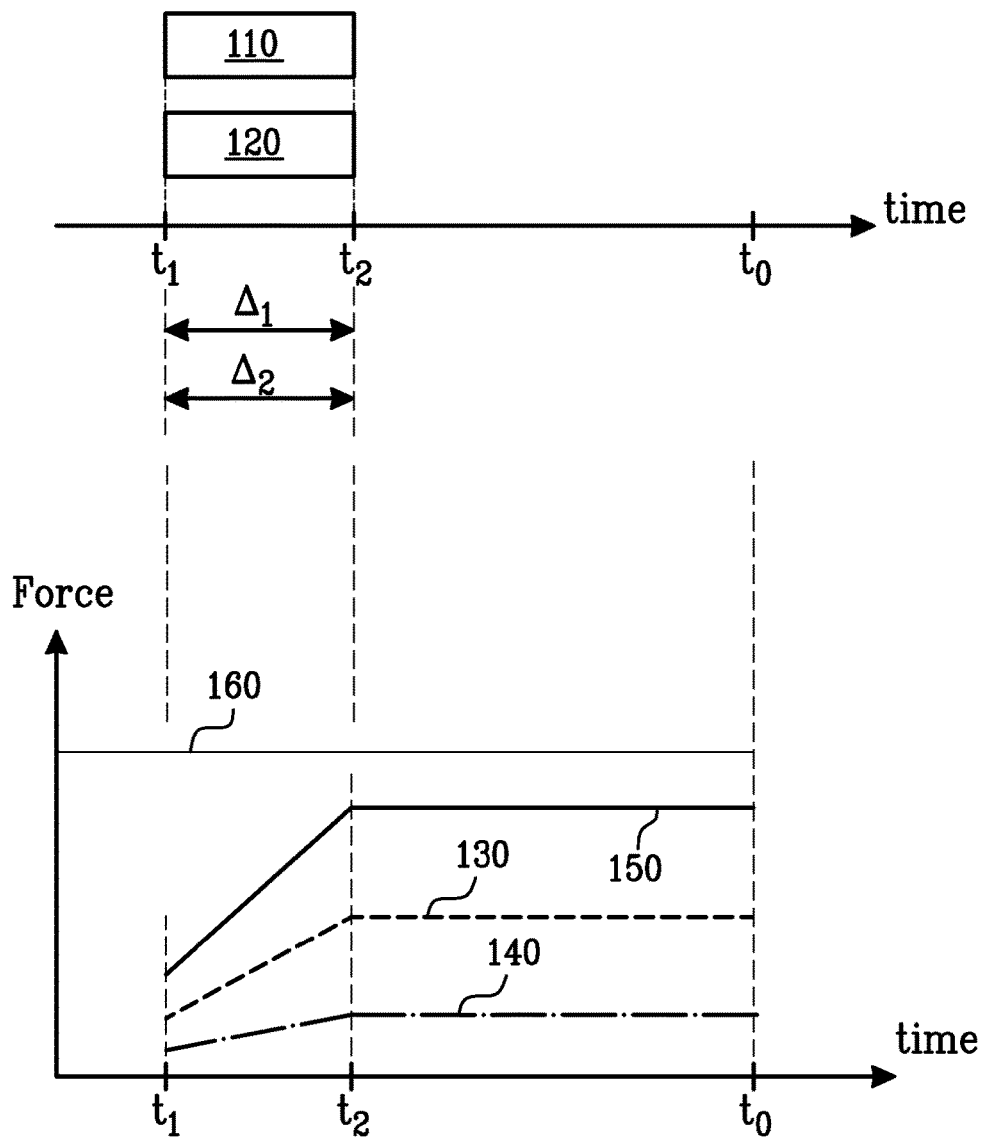
FIG. 3 illustrates a method according to the disclosure for operation of a safety arrangement in a vehicle.

One way of adapting the pre-crash displacement 120 and the retraction 110 of the seat belt to each other is by stopping or slowing down the pre-crash displacement 120 of the seat if/when determining that the combined seat belt force 150 is about to reach the selectable level 160. FIG. 3 illustrates that the pre-crash displacement 120 of the seat is stopped, when the combined seat belt force 150 is about to reach the selectable level 160. This may result in that the available time will not be sufficient for the seat 5 and/or the portion 23 thereof to reach a position being the most favorable position for the seat occupant 7. However, the reached position will at least be more favorable than the position before the displacement.

Figure 4:
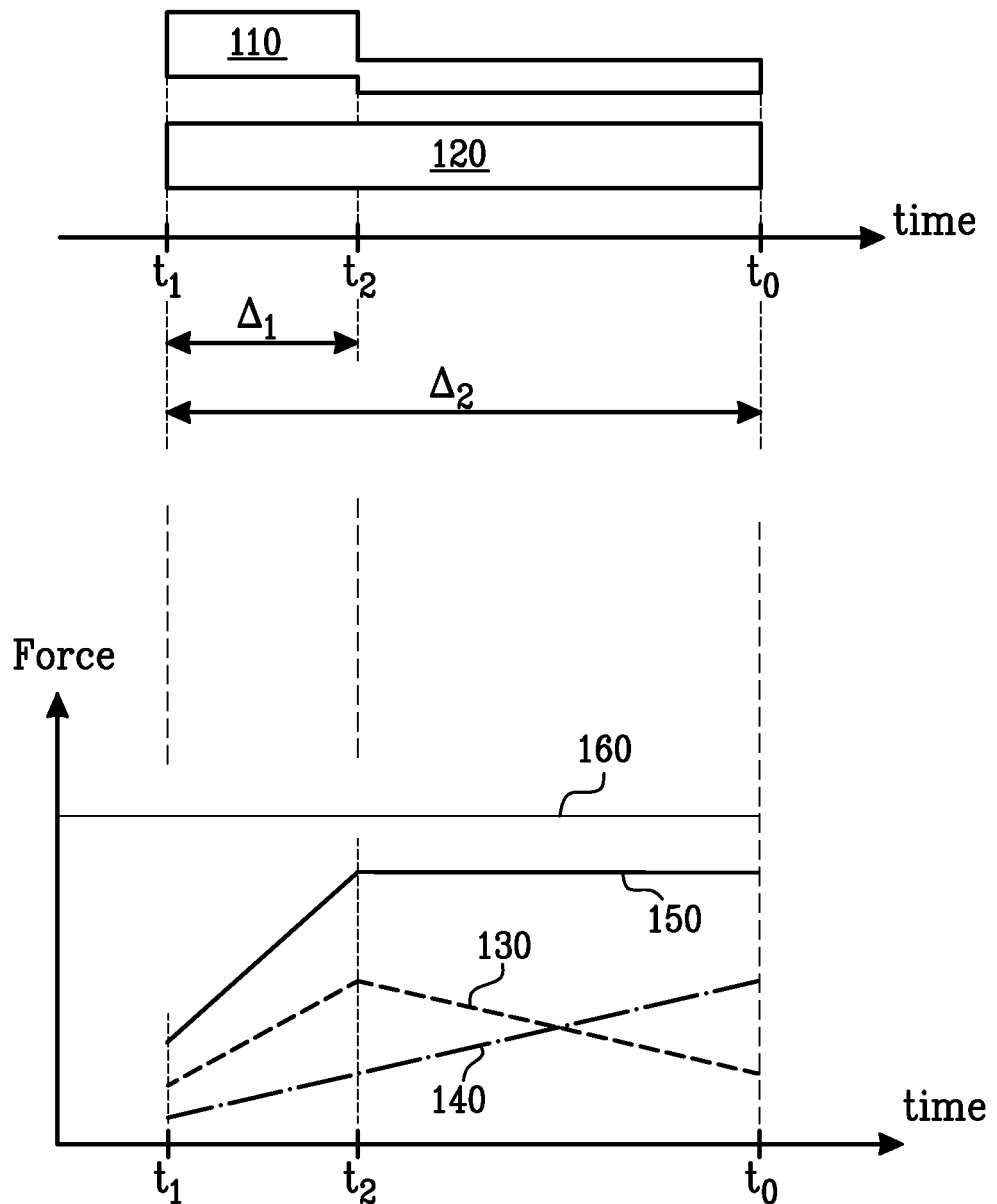
FIG. 4 illustrates another method according to the disclosure for operation of a safety arrangement in a vehicle.

As an alternative way, or as a complementary way, the adapting may be achieved by releasing the seat belt in parallel to performing the pre-crash displacement, such that a released length of the seat belt at least partly corresponds to the pre-crash displacement, as illustrated in FIG. 4. In that case, the seat belt 9 may, at least during a portion of the pre-crash displacement 120, be released instead of being refracted, such that the combined seat belt force 150 is maintained below the selectable level 160. Thereby the retraction force 110, i.e., the force exerted by seat belt 9 on the seat occupant 7 is decreased after the time $t_2$ in order to compensate for a forward displacement of the seat 5 and/or the portion 23 thereof.

Figure 5:
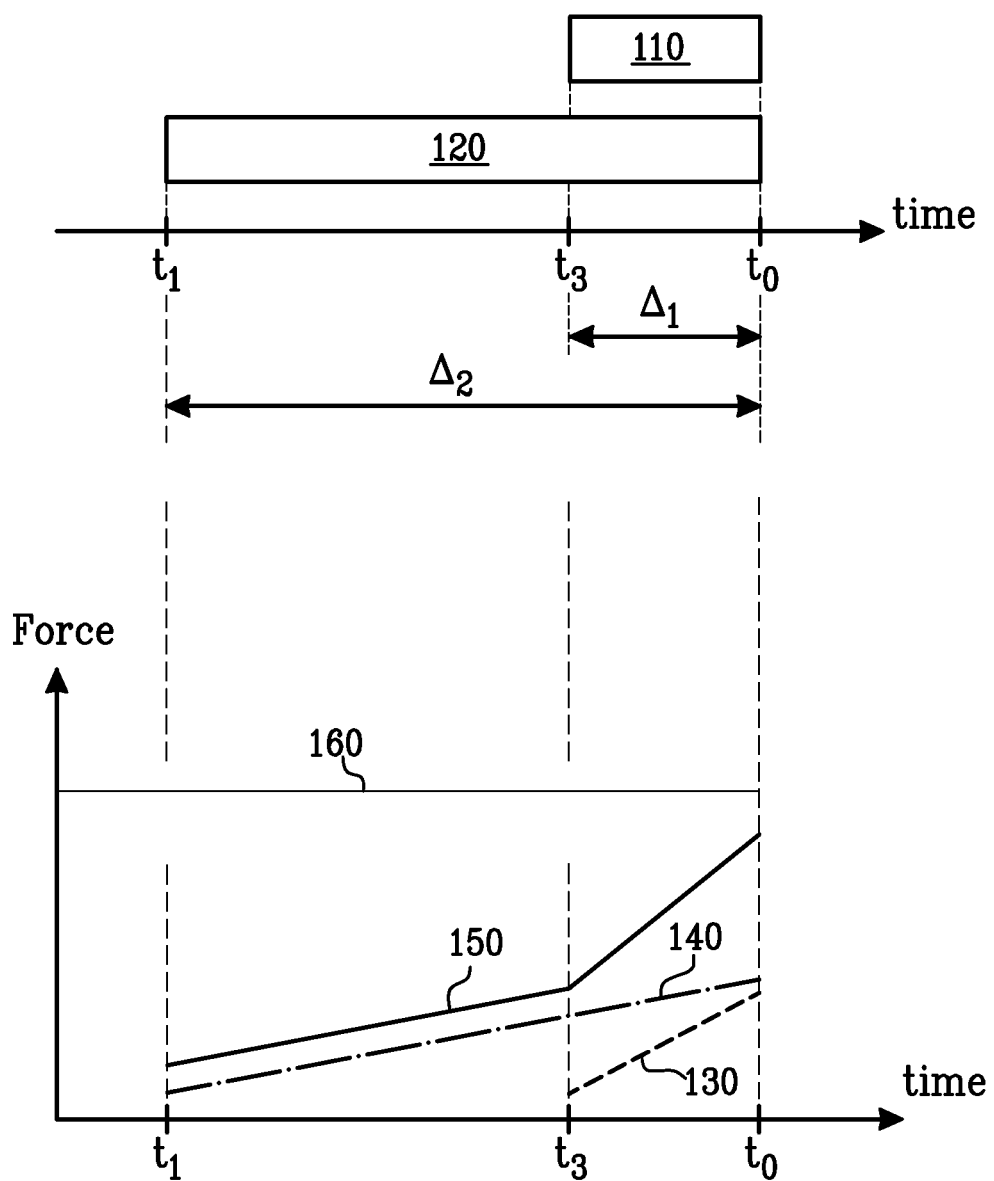
FIG. 5 illustrates yet another method according to the disclosure for operation of a safety arrangement in a vehicle.

As yet an alternative way, or as a complementary way, the adapting may be achieved by first starting the pre-crash displacement 120, and at a later phase of the pre-crash displacement 120 at a time $t_3$ start performing the retraction 110 of the seat belt 9 simultaneously with the pre-crash displacement 120, as illustrated in FIG. 5. The time $t_3$ is preferably chosen such that the refraction 110 is ready at the time $t_0$.

The shapes of the curves in FIGS. 2-5 are for illustrative purposes only. Their shapes may vary from safety arrangement to safety arrangement. Their shapes may also vary depending on the situation when the retraction and the pre-crash displacement are performed, e.g., due to if the seat occupant leans forward or not and/or due to how much the seat will be repositioned.

As one skilled in the art would understand, the above-mentioned processor 17 may communicate with and/or control operation of the various arrangements and systems (e.g., 1, 15, 19, 29). Furthermore, the processor 17 may include or be in communication with one or more storage devices or media including computer readable program instructions that are executable by the processor 17 so that the processor 17 may perform particular algorithms represented by the functions and/or operations described herein. As one skilled in the art would further understand, each of the above-described arrangements and systems (e.g., 1, 15, 19, 29) may also include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular arrangement or system may perform particular algorithms represented by the functions and/or operations described herein. Each arrangement and system may also, or instead, include one or more application specific integrated circuits, programmable gate arrays or programmable array logic, programmable logic devices, or digital signal processors.

Further modifications of embodiments according to the disclosure are feasible within the scope of the appended claims. As such, the present disclosure should not be considered as limited by the embodiments and figures described herein. Rather, the full scope of the disclosure should be determined by the appended claims, with reference to the description and drawings.

What is claimed is:

1. A method for operation of a safety arrangement in a vehicle, the safety arrangement comprising a seat belt, a seat belt retractor and at least one seat position adjustment arrangement for position adjustment of a seat of the vehicle and/or a portion of the seat, the method comprising:

retracting the seat belt by the seat belt retractor with a retraction force;

displacing the seat and/or the portion of the seat prior to a crash, such that a displacement force acts on the seat belt; and adapting the pre-crash displacement and the retraction of the seat belt to each other by ascertaining that a combined seat belt force comprising the retraction force and the displacement force does not exceed a selectable level.

2. The method according to claim 1 wherein the adapting comprises stopping or slowing down the pre-crash displacement of the seat or the portion of the seat if determined that the combined seat belt force is about to reach the selectable level.

3. The method according to claim 1 wherein the adapting comprises releasing the seat belt during the pre-crash displacement, such that the releasing at least partly corresponds to a tightening of the seat belt caused by the pre-crash displacement of the seat or the portion of the seat.

4. The method according to claim 1 wherein the adapting comprises first starting the pre-crash displacement, and at a later point of time performing the retraction of the seat belt.

5. The method according to claim 4 wherein the adapting comprises performing the retraction simultaneously with a part of the pre-crash displacement.

6. The method according to claim 1 wherein the pre-crash displacement comprises displacing the seat in relation to a body of the vehicle and/or displacing a seat back in relation to a seat squab.

7. The method according to claim 1 wherein the combined seat belt force is monitored by determining if the seat belt is actually being retracted when the seat belt retractor is activated.

8. The method according to claim 1 wherein the selectable level of the combined seat belt force is selectable based on vehicle occupant data.

9. A safety arrangement for a vehicle having a seat, the safety arrangement comprising:
a seat belt;
a seat belt retractor adapted for retraction of the seat belt with a retraction force;
at least one seat position adjustment arrangement adapted for a pre-crash displacement of the seat and/or a portion of the seat, the pre-crash displacement resulting in a displacement force acting on the seat belt;
a first sensor for determining a combined seat belt force acting on the seat belt, the combined seat belt force comprising the retraction force and the displacement force; and
a processor for adapting the pre-crash displacement and the retraction of the seat belt to each other by ascertaining that the combined seat belt force does not exceed a selectable level.

10. The safety arrangement according to claim 9 wherein the at least one seat position adjustment arrangement comprises a seat back inclination adjustment arrangement adapted to displace a seat back of the seat.

11. The safety arrangement according to claim 9 wherein the first sensor comprises a sensor for determining pulled out length of the seat belt.

12. The safety arrangement according to claim 9 wherein the first sensor comprises a sensor for determining speed of a motor of the seat belt retractor.

13. The safety arrangement according to claim 9 further comprising a second sensor for determining a position of the seat, to which the seat belt is associated, or for determining a position of a portion of the seat.

14. The safety arrangement according to claim 9 further comprising a system for detecting a collision or an imminent collision involving the vehicle.

15. A vehicle comprising the safety arrangement according to claim 9.

16. A safety arrangement for a vehicle having a seat, a seat belt associated with the seat and a seat belt retractor adapted for retraction of the seat belt with a retraction force, the safety arrangement comprising:
at least one seat position adjustment arrangement adapted for a pre-crash displacement of the seat and/or a portion of the seat, the pre-crash displacement resulting in a displacement force acting on the seat belt;
a first sensor for determining a combined seat belt force acting on the seat belt, the combined seat belt force comprising the retraction force and the displacement force; and
a processor for adapting the pre-crash displacement and the retraction of the seat belt to each other by ascertaining that the combined seat belt force does not exceed a selectable level.

17. The safety arrangement according to claim 16 wherein the at least one seat position adjustment arrangement comprises a seat back inclination adjustment arrangement adapted to displace a seat back of the seat and/or an arrangement for positioning the seat in relation to a body of the vehicle.

18. The method according to claim 1 further comprising determining pulled out length of the seat belt using a sensor.

19. The method according to claim 1 further comprising determining speed of a motor of the seat belt retractor using a sensor.

20. The method according to claim 1 further comprising sensing position of the seat or sensing position of the portion of the seat.

* * * * *